(12) United States Patent
Peiffer et al.

(10) Patent No.: US 7,112,360 B2
(45) Date of Patent: *Sep. 26, 2006

(54) TRANSPARENT, BIAXIALLY ORIENTED POLYESTER FILM

(75) Inventors: Herbert Peiffer, Mainz (DE); Martin Mueller-Roosen, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/740,008

(22) Filed: Dec. 18, 2003

(65) Prior Publication Data

US 2004/0142194 A1 Jul. 22, 2004

Related U.S. Application Data

(63) Continuation of application No. 10/077,454, filed on Feb. 15, 2002, now abandoned.

(30) Foreign Application Priority Data

Feb. 26, 2001 (DE) ................. 101 09 217

(51) Int. Cl.
*B32B 15/09* (2006.01)
*B32B 27/18* (2006.01)
*B32B 27/20* (2006.01)
*B32B 27/36* (2006.01)
*B29C 55/12* (2006.01)

(52) U.S. Cl. ............. 428/141; 428/323; 428/331; 428/332; 428/337; 428/339; 428/457; 428/458; 428/480; 428/910; 428/694 SG; 264/288.4; 264/290.2

(58) Field of Classification Search ............. 428/323, 428/223, 428, 480, 910, 332, 338, 339, 141; 264/280, 288.4, 290.2
See application file for complete search history.

(56) References Cited

U.S. PATENT DOCUMENTS

| 3,154,461 | A | 10/1964 | Johnson ............... 161/116 |
| 4,818,581 | A | 4/1989 | Katoh et al. ........... 428/143 |
| 4,990,400 | A | 2/1991 | Endo et al. | |
| 5,077,118 | A | 12/1991 | Hasegawa et al. ....... 428/149 |

(Continued)

FOREIGN PATENT DOCUMENTS

DE 1 694 404 4/1971

(Continued)

OTHER PUBLICATIONS

Schimtz, Peter et al., "Films," Ullmann's Encyclopedia of Industrial Chemistry, 5$^{TH}$ Ed., vol. A11, pp. 85-95, 108-110.

*Primary Examiner*—Vivian Chen
(74) *Attorney, Agent, or Firm*—ProPat, L.L.C.

(57) ABSTRACT

The invention relates to a transparent, biaxially oriented polyester film which comprises at least 80% by weight of thermoplastic polyester and also comprises an amount in the range from 0.05 to 0.5% by weight of a specific pigment system. The invention further relates to a process for producing the film. The film can be used as a packaging film, or for metalizing or ceramic coating, and in applications in the industrial sector, as a substrate for stamping foils.

17 Claims, 2 Drawing Sheets

U.S. PATENT DOCUMENTS

| | | | | |
|---|---|---|---|---|
| 5,478,632 A | * | 12/1995 | Kurz et al. | 428/212 |
| 5,612,138 A | * | 3/1997 | Kurz et al. | 428/411.1 |
| 5,648,159 A | | 7/1997 | Sato | 428/327 |
| 5,955,181 A | | 9/1999 | Peiffer et al. | 428/212 |
| 6,607,808 B1 | * | 8/2003 | Peiffer et al. | 428/141 |
| 6,627,295 B1 | * | 9/2003 | Peiffer et al. | 428/141 |
| 6,630,224 B1 | * | 10/2003 | Peiffer et al. | 428/141 |
| 2002/0160168 A1 | | 10/2002 | Peiffer et al. | 428/215 |
| 2004/0142147 A1 | * | 7/2004 | Peiffer et al. | 428/141 |

FOREIGN PATENT DOCUMENTS

| | | | |
|---|---|---|---|
| EP | 0 053 498 A2 | | 6/1982 |
| EP | 0 347 646 A2 | | 12/1989 |
| EP | 0 502 745 A2 | | 9/1992 |
| EP | 0 514 129 A2 | | 11/1992 |
| EP | 0 604 057 A1 | | 6/1994 |
| EP | 0 770 473 | * | 5/1997 |
| JP | 59 15294859 | | 8/1984 |

* cited by examiner

TRANSPARENT, BIAXIALLY ORIENTED POLYESTER FILM

This application is a continuation of U.S. application Ser. No. 10/077,454 filed Feb. 15, 2002 now abandoned, which is herby incorporated by reference herein.

BACKGROUND OF THE INVENTION

The invention relates to a transparent, biaxially oriented polyester film composed of a layer which comprises at least 80% by weight of thermoplastic polyester. The invention further relates to a process for producing the film and to the use of the film.

The polyester film of the invention also comprises a specific pigment system which provides improved winding of the film and gives a highly transparent film with high-gloss surfaces. The film has very high suitability for use as a packaging film, in particular for metallizing or ceramic coating, and for applications in the industrial sector, e.g. as a substrate for stamping films.

In the packaging industry there is a high level of demand for highly transparent and high-gloss plastic films, e.g. biaxially oriented polypropylene films or biaxially oriented polyester films. These highly transparent, high-gloss films have a characteristic appearance and give the packaging, for example, an appearance which is particularly attractive and therefore particularly effective for promotional purposes. The problem with films subject to high requirements for the optical properties of the film is, inter alia, their windability, which does not always meet the requirements set, in particular if the machine rolls are processed to give wide customer rolls of high running length.

The prior art shows how the optical properties, in particular the gloss and the haze, of biaxially oriented polyester films can be improved.

EP 347 646 describes a biaxially oriented polyester film which has at least one outer layer (A) which comprises a concentration of from 0.5 to 50% of a filler, the diameter of this filler being in a particular ratio to the thickness of the outer layer. The outer layer also has a certain thickness and a certain degree of crystallization, which is determined with the aid of Raman spectroscopy. The topography of the outer layer A makes the film particularly suitable for magnetic recording tapes. The specification gives no information concerning the transparency of the film or the gloss achieved on the outer layer A. A film produced as in EP-A 347 646, did not have the desired transparency, nor the desired glossy surface. The gloss of this surface and the haze of the film are outside the range claimed in this specification.

EP-A-0 514 129 describes a transparent multilayer film which encompasses a primary layer substrate made from polymer material which has, at least on one of its surfaces, a secondary layer made from polymer material and having glass beads and silicon dioxide particles at particular concentrations and in particular size distributions. The arrangement of the secondary layer may be on one side or on both sides of the primary layer substrate. The film improves haze and processing properties, but the specification teaches nothing concerning improvement of the gloss and of the windability of the film.

EP-A-0 604 057 describes a transparent multilayer film which encompasses a primary layer substrate made from polymer material and substantially free from fillers, and having, on one of its surfaces, a secondary layer which is made from polymer material and which comprises a concentration of from 100 to 1000 ppm of silicone resin with a median particle diameter of from 1.5 to 12.5 μm. A disadvantage of the silicone particles is that these are comparatively expensive and do not represent an acceptable solution for the packaging market. In addition, films equipped with pigments of this type tend to telescope on winding. Nor does that specification give any indication at all as to how the topography of such a film is to be adjusted for simultaneous improvement of gloss and windability.

DE-A-16 94 404 describes a laminate with a plurality of layers of an oriented crystalizable thermoplastic film, in which at least one of the outer layers comprises an additive. The additives are conventional inert inorganic or organic particles which, in the case of the inert particles such as $SiO_2$, are added at a concentration of from 1 to 25% by weight to the outer layers. The particle size here is from 2 to 20 μm. The laminates may be metalized with aluminum for decorative purposes or used for magnetic tapes. Although the teaching of this specification enables the processing properties and the haze of the film to be improved, the specification gives no teaching concerning improvement in the gloss or in the windability of the film.

EP-A-0 502 745 describes a coextruded biaxially oriented polyester film with at least three layers, of which an outer layer A a) comprises inorganic particles with a mean primary particle size D in the range from 1 to 100 nm and complying with the equation $D<T<200D$, where T is the thickness of layer A, b) comprises particles B with a mean primary particle size D1 in the range from 0.3 to 2 μm and with a primary particle size distribution having a relative standard deviation of not more than 0.6, and c) where the mean primary particle size D of the particles A is smaller than the mean primary particle size D1 of the particles B.

The teaching of this specification in particular improves the processing performance of the film. The specification gives no teaching concerning improvement of the gloss of the film, or of its haze or windability.

It was therefore an object of the present invention to provide a biaxially oriented polyester film which has very good optical properties and in particular has very high gloss and very low haze. The film should also be very easy to wind, in particular when the machine roll is processed to give wide customer rolls of high running length. In addition, the film is to be very easy to produce and to process, and is to provide a very good oxygen barrier after metalization or after coating with oxidic materials. In summary, the object was to provide a film with the following combination of features:

high gloss
low haze
good winding
low oxygen transmission of the film after metalizing or after coating with oxidic materials
low coefficients of friction.

The gloss of the film is intended to be greater than 150, and the haze lower than 4.0%. The film is intended to be very easy to wind, and this means in particular that there are to all intents and purposes no longitudinal corrugations in customer rolls produced from a machine roll. This applies in particular when these are wide customer rolls of high running length. It is intended that less than 1.0 $cm^3$ of oxygen per square meter and per day will diffuse through the metalized film when it is subjected to air at a pressure of 1 bar. In respect of other properties, the quality of the film is intended to be at least equal to that of the known packaging films of this type. The film is also intended to be simple and cost-effective to produce, and to be very easy to process on conventional machinery. The coefficient of friction on both surfaces is intended to be less than 0.6.

A further intention is to ensure that cut material arising during film production can be reintroduced to the manufacturing process as regrind in amounts of up to 60% by weight, based on the total weight of the film, without any resultant significant adverse effect on the physical or optical properties of the film.

BRIEF DESCRIPTIONS OF THE INVENTION

According to the invention, the object is achieved by providing a transparent, biaxially oriented polyester film with a layer which comprises at least 80% by weight of thermoplastic polyester, where the film also comprises an amount in the range from 0.05 to 0.5% by weight, based on the total weight of the film, of a pigment system which has the following features
  a) the median diameter ($d_{50}$) is in the range from 1.5 to 5 µm and
  b) the spread of the distribution, expressed via the SPAN 98, is less than or equal to 1.9.

The subclaims give preferred embodiments of the invention, which are described in more detail below.

DETAILED DESCRIPTION OF THE INVENTION

Figure 1:
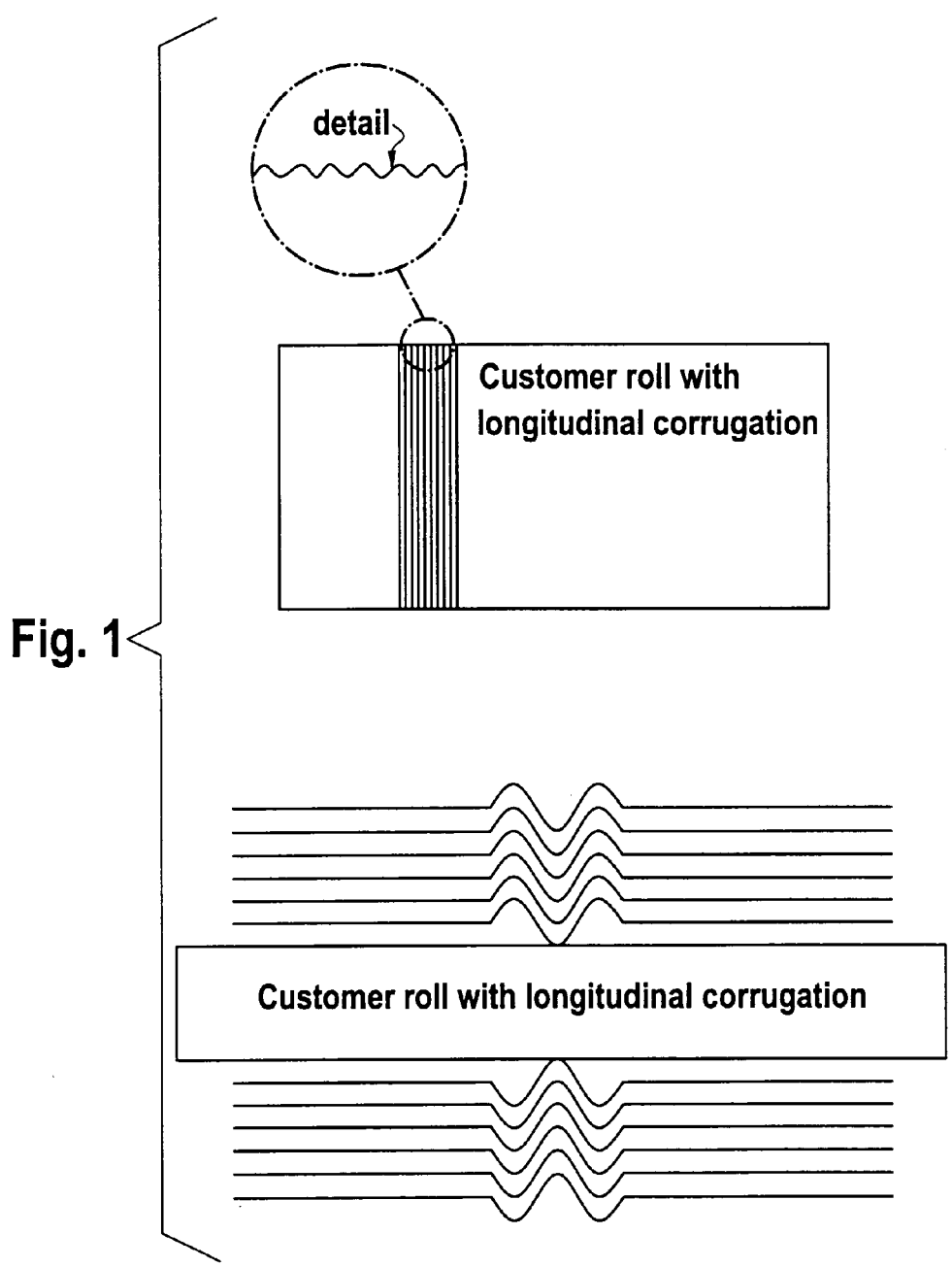
FIG. 1 shows a customer roll with clearly visible corrugations.

According to the invention, the film has one layer and preferably comprises at least 90% by weight of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid [poly-(1,4-cyclohexanedimethylene terephthalate), PCDT], or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters of which at least 90 mol %, preferably at least 95 mol %, is composed of ethylene glycol units and terephthalic acid units, or of ethylene glycol units and naphthalene-2,6-dicarboxylic acid units. In one particularly preferred embodiment, the film is composed of polyethylene terephthalate homopolymer. The remaining monomer units derive from other aliphatic, cycloaliphatic or aromatic diols and, respectively, dicarboxylic acids.

Other examples of suitable aliphatic diols are diethylene glycol, triethylene glycol, aliphatic glycols of the formula HO—$(CH_2)_n$—OH, where n is an integer from 3 to 6, in particular 1,3-propanediol, 1,4-butanediol, 1,5-pentanediol and 1,6-hexanediol, and branched aliphatic glycols having up to 6 carbon atoms. Among the cycloaliphatic diols, mention should be made of cyclohexanediols, in particular 1,4-cyclohexanediol. Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—, Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids themselves and the diols.

To achieve the desired high gloss, the film comprises an effective amount of from 0.05 to 0.5% by weight, based on the total weight of the film, of the pigment system of the invention. The particle concentration is from 0.055 to 0.45% by weight in the preferred embodiment of the film, and is from 0.06 to 0.4% by weight in the particularly preferred embodiment, and substantially depends on the desired optical properties and the running properties of the film.

Typical particle systems are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

It is also possible to select mixtures of two or more different particle systems, or mixtures of particle systems of the same chemical makeup but of different particle size. The particles may be added to the polymers of each layer of the film in the respective advantageous concentrations, e.g. as a glycolic dispersion during the polycondensation, or by way of masterbatches during extrusion.

If the concentration of the particles is greater than that prescribed, the desired optical properties (high transparency and high gloss) are no longer achieved. The film becomes cloudy and the surface becomes dull (matt). If, on the other hand, the concentration of the particles is smaller than that prescribed, this adversely affects the running properties and, respectively, the processing properties of the film. The surface of the film tends to block, and it is therefore impossible to ensure good processability, in particular on high-speed machinery.

Preferred particles are $SiO_2$ in colloidal or in chain-type form. These particles are bound very effectively into the polymer matrix.

It has been found that the particle diameter and the scattering (spread) of the diameter of the pigment system used affect the gloss, the haze, and in particular the windability of the film. It has been found that a smaller spread of the median diameter brings about a more uniform thickness of air layer between the laps of film and thus reduces any tendency toward blocking of the laps of film against one another, or, respectively, improves windability.

To achieve the lowest possible haze, the highest possible gloss, and good windability, the film of the present invention comprises a pigment system in which the median diameter (the $d_{50}$) is in the range from 1.5 to 5.0 µm, and the spread (expressed via the SPAN 98) is less than or equal to 1.9.

In the preferred embodiment, the outer layer (A) of the film of the present invention comprises a pigment system in which the median diameter is in the range from 1.6 to 4.9 µm and the spread is less than or equal to 1.8. In the particularly preferred embodiment, the film of the present invention comprises a pigment system in which the median diameter is in the range from 1.7 to 4.8 µm and the spread is less than or equal to 1.7.

If the film comprises a pigment system in which the median diameter and the spread are outside the inventive range, this has a particularly adverse effect on the windability of the film. There can also be an adverse resultant affect on the transparency of the film and its gloss.

If the film comprises a pigment system in which the median diameter is greater than 5.0 µm and the spread is greater than 1.9, there is in particular an adverse effect on the windability of the film. In these films there is an exacerbated tendency toward blocking of the film laps against one another. The customer rolls produced from the machine roll have an increased tendency toward formation of longitudinal corrugations, as illustrated in FIG. 1, where a number of corrugations become clearly visible around the periphery of the roll, these being more easily indented than the surroundings. These corrugations markedly restrict the processability and the use of the film. The longitudinal corrugations impressed into the films, in some cases irreversibly, are namely visible in the product during/after further processing (e.g. metalization, printing, stamped foil application), and are an optical/mechanical defect directly impairing the usability of the film. Wide rolls (above 1.5 m) and rolls of high running length (greater than 24 000 m) in particular have a strong tendency toward formation of these longitudinal corrugations. In addition, it has been found that films with the abovementioned pigment system which is unfavorable for the purposes of the present invention have an exacerbated tendency toward loss of transparency and toward reduced gloss.

If the film comprises a pigment system in which the median diameter is smaller than 1.5 µm and the spread is greater than 1.9, this likewise can become noticeable in impaired winding and impaired optical properties. The large number of small pigment particles (broad distribution of pigment system and small particle diameter) form a large number of scattering centers in the film, and these reduce not only the transparency of the film but also its gloss. Another result here is impairment of the windability of the roll, and indeed to the degree described above. With median diameters of less than 1.5 µm there is also a very pronounced tendency toward telescoping or off-center running of the rolls during winding.

In one useful embodiment, the gloss-appearance film is described by the following further parameters:

a) The roughness of the film, expressed by its $R_a$-value, is in the range from 30 to 150 nm, preferably from 35 to 140 nm, particularly preferably from 40 to 130 nm. Roughness values smaller than 30 nm have an adverse effect on running properties when the claimed particle system is used, and values greater than 130 nm impair the optical properties of the film.

b) The value measured for surface gas flow is in the range from 4 to 200 s, preferably in the range from 5 to 180 s. At values above 200 the windability of the film is adversely affected.

The film may also comprise customary additives, such as stabilizers. Phosphorus compounds, such as phosphoric acid or phosphoric esters, are advantageously used as stabilizers.

The total thickness of the polyester film of the invention may vary within certain limits. It is in the range from 3 to 80 µm, in particular from 4 to 50 µm, preferably from 5 to 30 µm.

The invention also provides a process for producing the polyester film of the invention by an extrusion method known from the literature.

The procedure for this process is that melt is extruded through a flat-film die, and the resultant prefilm is drawn off on one or more rolls for solidification, and the solidified prefilm is then biaxially stretched (oriented), and the biaxially stretched film is heat-set and, where appropriate, also corona- or flame-treated on the surface intended for treatment.

The biaxial stretching (orientation) is generally carried out sequentially, the type of sequential biaxial stretching preferred being that which first stretches longitudinally (in the machine direction) and then stretches transversely (perpendicularly to the machine direction).

As is usual in extrusion, the polymer or the polymer mixture is first compressed and plasticized and thus homogenized in an extruder, at which juncture any additives used may already be present in the polymer or the polymer mixture. The melt is then extruded through a flat-film die (slot die), and the extruded melt is drawn off on one or more take-off rolls, whereupon the melt cools and solidifies to form a prefilm.

The biaxial stretching is generally carried out sequentially, preferably stretching the prefilm first longitudinally (i.e. in the machine direction=MD) and then stretching transversely (i.e. perpendicularly to the machine direction=TD). This leads to orientation of the polymer chains in space. The longitudinal stretching may be carried out with the aid of two rolls rotating at different speeds corresponding to the desired stretching ratio. For the transverse stretching, use is generally made of an appropriate tenter frame, clamping both edges of the film and then drawing toward the two sides at an elevated temperature, perpendicularly to the direction of running.

The temperature at which the stretching is carried out may vary within a relatively wide range, and depends on the properties desired from the film. The longitudinal stretching is generally carried out at a temperature in the range from 80 to 130° C., and the transverse stretching in the range from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink subsequently to be applied, or else to improve antistatic performance or processing performance.

For producing a film with a good oxygen barrier (after metalization or after coating with ceramic substances), and with improved winding and improved transparency, it has proven advantageous for the planar orientation Δp of the film to be greater than 0.165, preferably greater than 0.166, and very preferably greater than 0.167.

The significant variables affecting the planar orientation Δp have been found to be the process parameters for longitudinal and transverse stretching, and also the SV of the raw material used. The process parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed, and the nature of the stretching, in particular that in the longitudinal direction of the machine. For example, if the planar orientation Δp obtained on a machine is 0.163 using the parameter set $\lambda_{MD}$=3.7 and $\lambda_{TD}$=3.8, the stretching temperatures longitudinally and transversely being $T_{MD}$=80–123° C. and $T_{TD}$=80–126° C., then lowering the longitudinal stretching temperature to $T_{MD}$=80–118° C. or lowering the transverse stretching temperature to $T_{TD}$=80–122° C. or increasing the longitudinal stretching ratio to $\lambda_{MD}$=4.5 or increasing the transverse stretching ratio to $\lambda_{TD}$=4.0 gives a planar orientation Δp within the desired range. The film web speed here was 370 m/min and the SV of the material was about 730. The data given for longitudinal stretching are based on what is known as LTEP stretching, composed of a low-level-orienting stretching step (LOE=Low Orientation Elongation) and of a highly orienting stretching step (REP=Rapid Elongation Process). The ratios obtained using other stretching equipment are in principle identical, but there may be very slight differences in the numerical values for the respective process parameters. The temperatures stated are based on the respective roll temperatures for longitudinal stretching and on the film temperatures measured by IR for transverse stretching.

In the heat-setting which follows, the film is held at a temperature of from 150 to 250° C. for a period of from about 0.1 to 10 s. The film is then wound up in the usual way.

After the biaxial stretching, it is preferable for one or both surfaces of the film to be corona- or flame-treated by one of the known methods. The intensity of treatment selected is expediently such as to give the film a surface tension in the range above 45 mN/m.

The film may also be coated to achieve other desired properties. Typical coatings are layers with adhesion-promoting, antistatic, slip-enhancing, or release effect. It is, of course, possible for these additional layers to be applied to the film by in-line coating using aqueous dispersions after longitudinal strtetching and prior to transverse stretching.

The film of the invention has excellent optical properties, i.e. high gloss and high transparency, very good winding performance, and very good processing performance.

In addition, it has been ensured that the cut material (regrind) arising during film production can be reintroduced to the extrusion process in amounts in the range from 20 to 60% by weight, based on the total weight of the film, without any significant resultant adverse effect on the physical properties of the film, in particular its appearance.

The film therefore has quite excellent suitability for use in flexible packaging, and specifically wherever its excellent processability can be utilized to full advantage, in particular on high-speed packaging machinery.

The table below (Table 1) gives the most important film properties of the invention again at a glance.

TABLE 1

| | Inventive range | Preferred | Particularly preferred | Unit | Test method |
|---|---|---|---|---|---|
| Gloss, 20° | >150 | >155 | >160 | | DIN 67530 |
| COF (Friction) | <0.6 | <0.55 | <0.50 | | DIN 53375 |
| Average roughness $R_a$ | 30–150 | 35–140 | 40–130 | nm | DIN 4768. Cutoff of 0.25 mm internal |
| Range of values measured for surface gas flow | 4–200 | 5–180 | 6–160 | sec | internal |
| Other film properties | | | | | |
| Haze | <4.0 | <3.5 | <3.0 | % | ASTM-D 1003-52 internal |
| Planar orientation Δp (optional) | >0.165 | >0.166 | ≧0.167 | | |
| Oxygen transmission after metalization of layer A | <1.0 | <0.95 | <0.9 | $cm^3/(m^2 \cdot d \cdot bar)$ | DIN 53380 |

The following test methods were utilized for the purposes of the present invention to characterize the raw materials and the films:

SV (Standard Viscosity)

Standard viscosity SV (DCA) is measured in dichloroacetic acid by a method based on DIN 53726.

Intrinsic viscosity (IV) is calculated as follows from standard viscosity $$IV(DCA) = 6.907 \cdot 10^{-4} SV(DCA) + 0.063096$$

Coefficient of Friction (COF)

Coefficient of friction was determined to DIN 53 375. The coefficient of sliding friction was measured 14 days after production.

Surface Tension

Surface tension was determined by what is known as the ink method (DIN 53 364).

Haze

Hölz haze was measured by a method based on ASTM-D 1003-52 but, in order to utilize the most effective measurement range, measurements were made on four laps of film laid one on top of the other, and a 1° slit diaphragm was used instead of a 4° pinhole.

Gloss

Gloss was determined to DIN 67 530. Reflectance was measured, as an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface Gas Flow Time

The principle of the test method is based on the air flow between one side of the film and a smooth silicon wafer sheet. The air flows from the surroundings into an evacuated space, and the interface between film and silicon wafer sheet acts to resist flow.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test conditions:

| Test area | 45.1 cm² |
|---|---|
| Weight applied | 1276 g |
| Air temperature | 23° C. |
| Humidity | 50% relative humidity |
| Aggregated gas volume | 1.2 cm³ |
| Pressure difference | 56 mbar |

Determination of Planar Orientation Δp

Planar orientation is determined by measuring the refractive index with an Abbe refractometer according to internal operating prescription 24.

Preparation of specimens:

Specimen size and length: from 60 to 100 mm

Specimen width: corresponds to prism width of 10 mm

To determine $n_{MD}$ and $n_a$ ($=n_z$), the specimen to be tested has to be cut out from the film with the running edge of the specimen running precisely in the direction TD. To determine $n_{TD}$ and $n_a$ ($=n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.70. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a$ ($=n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a$ ($=n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Measurement of Median Particle Diameter $d_{50}$

The median particle diameter $d_{50}$ was determined by laser on a Malvern MasterSizer by the standard method (examples of other measurement devices are the Horiba LA 500 or Sympathec Helos, which use the same principle of measurement). For the tests, the specimens were placed in a cell with water, and this was then placed into the test device. The test procedure is automatic and includes the mathematical determination of the $d_{50}$ value.

Figure 2:
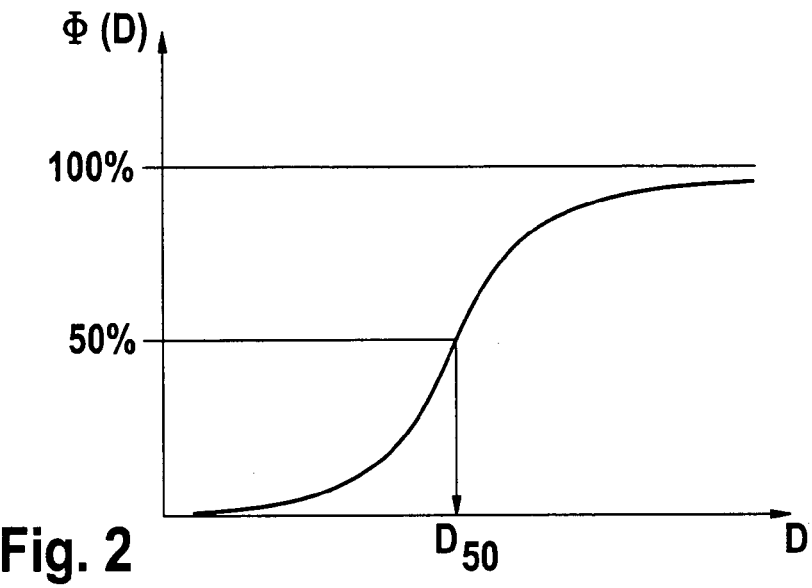
FIGS. 2 and 3 show graphs for the determination of $d_{50}$, $d_{10}$ and $d_{98}$ of particles

The $d_{50}$ value here is determined as defined from the (relative) cumulative particle size distribution curve: the point of intersection of the 50% ordinate with the cumulative curve directly gives the desired $d_{50}$ value on the abscissa axis, as shown more precisely in FIG. 2.

Measurement of SPAN 98

The test device used to determine SPAN 98 was the same as that described above for the determination of median diameter $d_{50}$. SPAN 98 is defined here as follows:

$$SPAN98 = \frac{d_{98} - d_{10}}{d_{50}}$$

Figure 3:
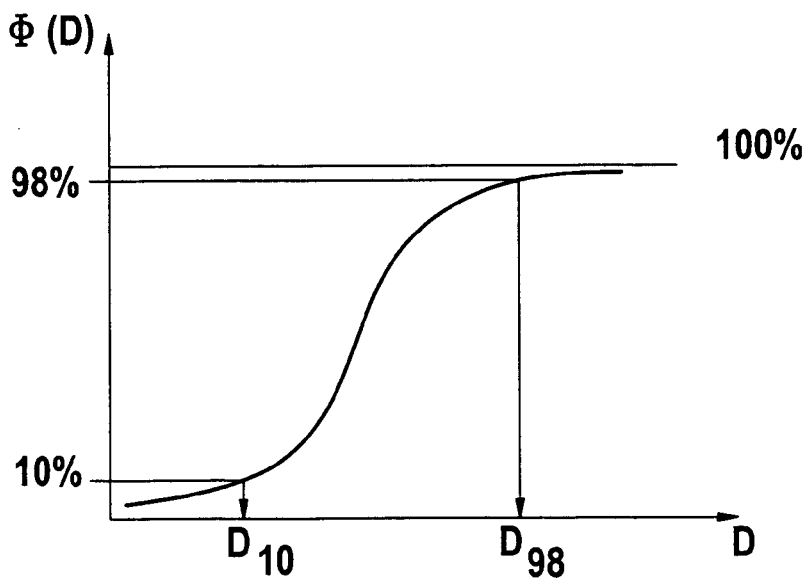

The (relative) cumulative particle size distribution curve is again used as a basis for determining $d_{98}$ and $d_{10}$. The point of intersection of the 98% ordinate value with the cumulative curve gives the desired $d_{98}$ value directly on the abscissa axis, and the point of intersection of the 10% ordinate value with the cumulative curve gives the desired $d_{10}$ value directly on the abscissa axis, as shown more precisely in FIG. 3.

EXAMPLE 1

Chips made from polyethylene terephthalate (prepared via the transesterification process using Mn as transesterification catalyst, Mn concentration: 100 ppm) were dried at a temperature of 150° C. to residual moisture below 100 ppm and fed, with the filler of the invention, to the extruder.

Extrusion followed by stepwise longitudinal and transverse orientation was used to produce a transparent film of thickness 12 μm.

The precise makeup of the film was:

90% by weight of polyethylene terephthalate with SV 800

10% by weight of masterbatch made from 99% by weight of polyethylene terephthalate and 1.0% by weight of silica particles (®Sylysia 320 from Fuji, Japan) with a $d_{50}$ of 2.5 µm and a SPAN 98 of 1.4.

The production conditions in each step of the process were:

| Extrusion: | Temperature | 290° C. |
|---|---|---|
| | Die width: | 25 mm |
| | Temperature of take-off roll | 30° C. |
| Longitudinal stretching: | Temperature | 80–126° C. |
| | Longitudinal stretching ratio: | 45 |
| Transverse stretching: | Temperature: | 80–135° C. |
| | Transverse stretching ratio: | 40 |
| Setting: | Temperature: | 230° C. |
| | Duration: | 3 s |

The film had the required high gloss and the required low haze. In addition, the film exhibits the desired winding performance and the desired processing performance. The structure of the film and the properties achieved in films produced in this way are shown in Tables 2 and 3.

EXAMPLE 2

Using Example 1 as a basis, the concentration of particles was now increased. The result was a marginal reduction in the gloss of the film and a marginal increase in the haze. However, windability was again improved.

EXAMPLE 3

Using Example 1 as a basis, the particle diameter was now increased while keeping the same spread. The result was a marginal reduction in the gloss of the film and a marginal increase in the haze. However, windability was again improved.

EXAMPLE 4

Using Example 1 as a basis, another pigment system was added. Besides the abovementioned pigments, the film also comprised 500 ppm of ®Aerosil TT 6000 (from Degussa), this being a fumed silica.

EXAMPLE 5

Using Example 4 as a basis, the coarser pigment Sylysia 320 was used instead of Sylysia 430.

COMPARATIVE EXAMPLE 1

Using Example 1 as a basis, the formulation was prepared using a conventional pigment system with coarser particle size and wider spread. The windability of the film became markedly poorer, and the optical properties likewise deteriorated.

TABLE 2

| Examples | Film thickness µm | Pigment type | Median pigment diameter $d_{50}$ in [µm] | Pigment concentrations [ppm] |
|---|---|---|---|---|
| E1 | 12 | Sylysia 320 | 2.5 | 1000 |
| E2 | 12 | Sylysia 320 | 2.5 | 1800 |
| E3 | 12 | Sylysia 430 | 3.4 | 1000 |
| E4 | 12 | Sylysia 320 + | 2.5 | 1000 |
| | | AerosilTT 600 | 0.05 | 500 |
| E5 | 12 | Sylysia 430 + | 3.4 | 1000 |
| | | Aerosil TT 600 | 0.05 | 500 |
| CE1 | 12 | $d_{50}$ = 5.5; | 2.5 | 1000 |
| | | SPAN98 = 2.2 + | 0.04 | 500 |
| | | Aerosil TT 600 | | |

TABLE 3

| Example | Friction COF Side A against Side C | Average roughness $R_a$ Side A | Average roughness $R_a$ Side C | Values measured for gas flow Side A | Values measured for gas flow Side C | ※p | Gloss Side A | Gloss Side C | Haze | Winding performance and handling | Processing performance |
|---|---|---|---|---|---|---|---|---|---|---|---|
| E1 | 0.45 | 57 | 53 | 91 | 86 | 0.167 | 182 | 180 | 3.0 | + | + |
| E2 | 0.41 | 61 | 60 | 71 | 74 | 0.167 | 171 | 173 | 3.5 | ++ | ++ |
| E3 | 0.48 | 88 | 84 | 30 | 24 | 0.167 | 174 | 175 | 3.1 | ++ | ++ |
| E4 | 0.38 | 60 | 63 | 82 | 73 | 0.167 | 170 | 173 | 3.2 | ++ | ++ |
| E5 | 0.40 | 84 | 82 | 28 | 31 | 0.167 | 170 | 169 | 3.3 | +++ | +++ |
| CB1 | | | | | | | | | | − | − |

Key to winding performance and processing performance of films:

+++: no tendency to stick to rolls or to other mechanical parts, no blocking problems, and absolutely no longitudinal corrugations on winding, exceptionally good processing performance ++: no tendency to stick to rolls or to other mechanical parts, no blocking problems, and no visible longitudinal corrugations on winding, very good processing performance +: no tendency to stick to rolls or to other mechanical parts, no blocking problems, and, on winding, at most one narrow longitudinal corrugation not irreversibly impressed, good processing performance −: tendency to stick to rolls or to other mechanical parts, blocking problems, and longitudinal corrugations on winding, and poor processing on packaging machinery

The invention claimed is:

1. A transparent, biaxially oriented polyester film which comprises at least 80% by weight of thermoplastic polyester, said film also comprising an amount in the range from 0.05 to 0.5% by weight, based on the total weight of the film, of a single pigment system having
   1) a median grain diameter ($d_{50}$) in the range from 1.5 to 5 μm and
   2) a spread of the distribution, expressed via the SPAN 98, of less than or equal to 1.9, said film further exhibiting a value measured for surface gas flow in the range from 4 to 200 s.

2. A transparent, biaxially oriented polyester film according to claim 1, said film exhibiting haze of less than or equal to 3.5%.

3. The transparent polyester film as claimed in claim 1, which comprises a single pigment system which has a median grain diameter ($d_{50}$) in the range from 1.6 to 4.9 μm.

4. The transparent polyester film as claimed in claim 1, which comprises a single pigment system which has a SPAN 98 of less than or equal to 1.8.

5. The transparent polyester film as claimed in claim 1, whose thickness is in the range from 1 to 50 μm.

6. The transparent polyester film as claimed in claim 1, whose gloss is greater than or equal to 150.

7. A transparent, biaxially oriented polyester film according to claim 1, said film further exhibiting a planar orientation Δp of greater than or equal to 0.165.

8. A process for producing a transparent polyester film as claimed in claim 1 by extrusion, in which the polyester is first compressed, plasticized, and thus homogenized in an extruder, at which juncture any additives provided may already be present in the polymer, and in which the melt is then pressed through a flat-film die, and the extruded melt is drawn off on one or more take-off rolls and solidified to give a preflim, and the solidified prefilm is then biaxially stretched, and the biaxially stretched film is heat-set and, where appropriate, also corona- or flame-treated on the surface intended for treatment, which comprises using a longitudinal stretching temperature in the range from 80 to 130° C. and a transverse stretching temperature in the range from 90 to 150° C. and using a longitudinal stretching ratio in the range from 2.5:1 to 6:1 and using a transverse stretching ratio in the range from 3.0:1 to 5.0:1.

9. The process as claimed in claim 8, wherein, after stretching, the film is heat-set at a temperature of from 150 to 250° C. for a period in the range from 0.1 to 10 s.

10. The process as claimed in claim 8, wherein one or both surfaces of the film are corona- or flame-treated, the intensity of the treatment being adjusted so as to give a surface tension of the film in the range greater than or equal to 45 mN/m.

11. The process as claimed in claim 8, wherein cut material arising during film production is reintroduced to the extrusion process as regrind in amounts in the range from 20 to 60% by weight, based on the total weight of the film.

12. The transparent polyester film as claimed in claim 1, wherein said film is packaging film which has been metallized or coated with an oxide material.

13. The transparent polyester film as claimed in claim 1, wherein said film is stamping film.

14. The transparent polyester film as claimed in claim 1, wherein said single pigment system consists essentially of colloidal silica.

15. A transparent, biaxially oriented polyester film which comprises at least 80% by weight of thermoplastic polyester, said film also comprising an amount in the range from 0.05 to 0.5% by weight, based on the total weight of the film, of a pigment system having
   1) a median grain diameter ($d_{50}$) in the range from 1.5w 5 μm and
   2) a spread of the distribution, expressed via the SPAN 98, of less than or equal to 1.9,
   said film further exhibiting a roughness, expressed as its $R_g$ value, in the range from 30 to 150 nm, and a value measured for surface gas flow in the range from 4 to 200 s.

16. A transparent, biaxially oriented polyester film comprising thermoplastic polyester and an amount in the range from 0.05 to 0.5% by weight, based on the total weight of the film, of a pigment system having
   1) a median grain diameter ($d_{50}$) in the range from 1.5 to 5 μm and
   2) a spread of the distribution, expressed via the SPAN 98, of less than or equal to 1.9, said film further exhibiting a surface roughness, Ra, of 35 to 150 nm; a haze of less than 4.0 and a gloss of greater than 150.

17. The transparent polyester film as claimed in claim 16, wherein said film ranges in thickness from 5 to 80 μm.

* * * * *

UNITED STATES PATENT AND TRADEMARK OFFICE
CERTIFICATE OF CORRECTION

PATENT NO. : 7,112,360 B2 Page 1 of 1
APPLICATION NO. : 10/740008
DATED : September 26, 2005
INVENTOR(S) : Peiffer et al.

It is certified that error appears in the above-identified patent and that said Letters Patent is hereby corrected as shown below:

Claims
Column 14
Claim 15, line 25, delete "w" insert -- to --.

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,112,360 B2 | Page 1 of 1 |
| APPLICATION NO. | : 10/740008 | |
| DATED | : September 26, 2006 | |
| INVENTOR(S) | : Peiffer et al. | |

It is certified that error appears in the above-identified patent and that said Letters Patent is hereby corrected as shown below:

Claims
Column 14
Claim 15, line 25, delete "w" insert -- to --.

This certificate supersedes Certificate of Correction issued December 12, 2006.

Signed and Sealed this

Ninth Day of January, 2007

JON W. DUDAS
*Director of the United States Patent and Trademark Office*